No. 610,718. Patented Sept. 13, 1898.
B. J. McLESKEY.
COTTON PLANTER AND FERTILIZER DISTRIBUTER.
(Application filed Aug. 17, 1897.)
(No Model.) 2 Sheets—Sheet 1.

Witnesses
Inventor
Balus J. McLeskey
By his Attorneys,

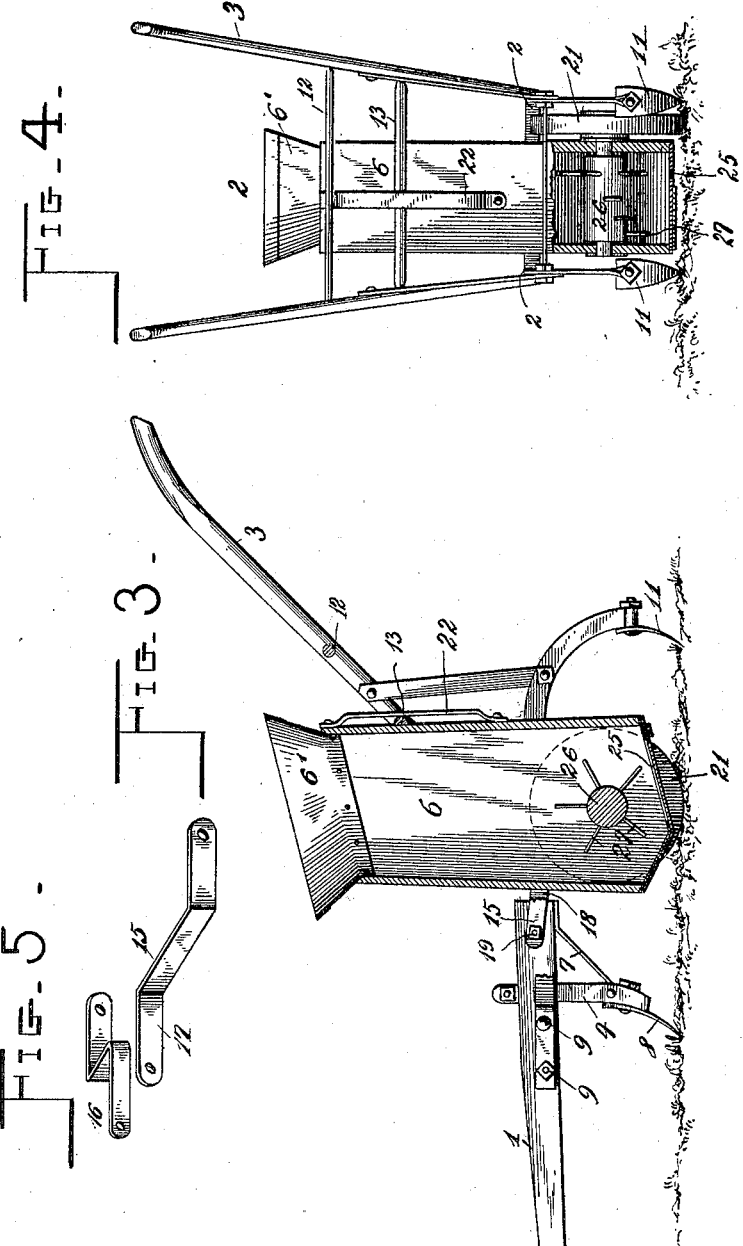

UNITED STATES PATENT OFFICE.

BALUS J. McLESKEY, OF REED CREEK, GEORGIA.

COTTON-PLANTER AND FERTILIZER-DISTRIBUTER.

SPECIFICATION forming part of Letters Patent No. 610,718, dated September 13, 1898.

Application filed August 17, 1897. Serial No. 648,584. (No model.)

*To all whom it may concern:*

Be it known that I, BALUS J. MCLESKEY, a citizen of the United States, residing at Reed Creek, in the county of Hart and State of Georgia, have invented a new and useful Cotton-Planter and Fertilizer-Distributing Machine, of which the following is a specification.

My invention relates to improvements in seed-planters, in which I have combined a seed and fertilizer distributing mechanism with a cultivator; and the object of the invention is to simplify the construction, render the parts more compact in their arrangement with relation to each other, and to promote the efficiency of the machine.

To the accomplishment of these ends my invention consists in the peculiar construction, combination, and adaptation of parts, which will be hereinafter fully described and claimed.

To enable others to understand my invention, I have illustrated the same in the accompanying drawings, forming a part of this specification, and in which—

Figure 1:
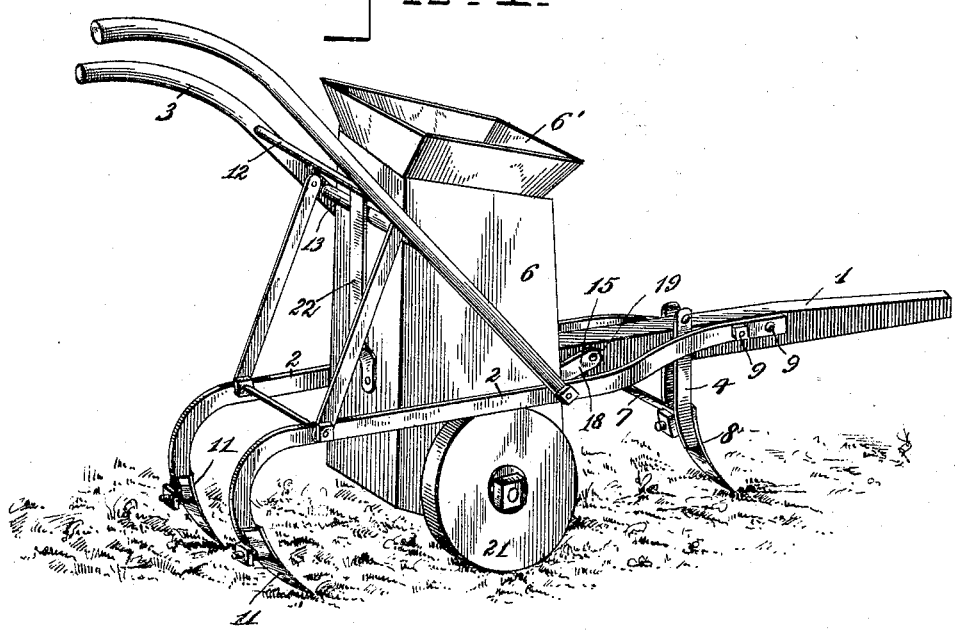
Figure 2:
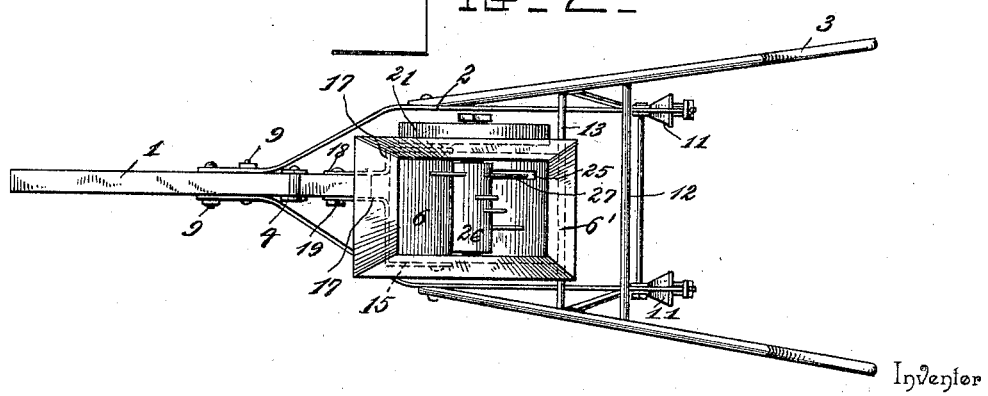

Figure 1 is a perspective view of a cotton-planter constructed in accordance with my invention. Fig. 2 is an inverted or bottom plan view of the same. Fig. 3 is a vertical longitudinal sectional view on the plane indicated by the dotted line 3 3 of Fig. 2. Fig. 4 is a rear elevation of the planter. Fig. 5 is a detail perspective view of the bail which carries the hopper.

Like numerals of reference denote corresponding parts in all the figures of the drawings, referring to which—

1 designates the beam of the implement.

2 are the laterally-diverging bars of the frame, and 3 are the handles. The front stock 4 is attached to the beam at a point in advance of the rear end of said beam, thus leaving the latter free and unobstructed for the attachment of the hopper-carrying bail 5, and the side bars 2 and the handles 3 are so disposed or arranged as to enable the hopper 6 to be positioned within the frame of the implement. The front stock 4 may be of any usual or preferred construction. It is braced by an inclined strut 7, and said stock carries the furrow-opening shovel or point 8, the latter being curved, as shown, and bolted to the stock.

The side bars 2 are bent inward at their front ends to bear against the sides of the beam at points in advance of the attachment of the stock 4 to said beam, and the front ends of these bars 2 are united to the beam by bolts 9, which pass through the ends of both braces and the beam. From their points of attachment to the beam the bars 2 diverge laterally in a horizontal plane to provide sufficient space between them for the accommodation of the hopper 6, and the rear ends of said side bars are bent or curved downward to support the rear shovels or points 11, which are suitably bolted to the bars 2.

The handles 3 of the implement are bolted at their lower ends to the side bars 2 at points opposite to the hopper. The handles have the usual transverse rod 12, by which they are braced, and in my implement I provide these handles with another rod 13, which not only further braces them, but serves as a means for holding the vertically-vibrating hopper in proper position within the frame of the implement.

The hopper consists of an elongated box-like structure and a rounded or angularly-formed bottom to said box-like structure. At its upper open end this hopper is constructed with a flared mouth 6', by which seed and fertilizer may be poured into the hopper without spilling or wasting the same, the flared mouth thus serving as a funnel for conveniently depositing the seed or fertilizer in the hopper.

The hopper is carried by a bail 15, consisting of two strap-like members 16 17, each of which is bent to embrace one side and a front of the hopper, and the front ends of these members of the bail are flanged at 18 to lap the rear extremity of the beam 1 of the implement. The rear ends of the members of the hopper-carrying bail are rigidly attached to the walls of the hopper by suitable bolts or other fastening means; but the front bent ends of the bail members are pivotally attached to the beam by a single pivotal bolt 19, which passes through the bent ends of the two members of the bail and through the beam, as shown.

By the employment of the bail, rigidly attached to the hopper and pivoted by a single bolt to the beam, the hopper is capable of a vertical play as it trails in rear of the implement. To maintain the hopper in position, I provide the ground-wheel 21 and the guide-loop 22; but as the ground-wheel is arranged to one side of the vertical axial line of the hopper and would be liable to tilt or cant the hopper sidewise I provide the guide-loop 22 to overcome any tilting or sidewise movement of the hopper.

The guide-loop or keeper 22 is arranged in a vertical position on the rear wall of the hopper, and the ends of said loop or keeper are rigidly attached to the hopper by bolts or other suitable fastenings. The keeper or loop is thus fast with the hopper to move or play vertically therewith, and said loop or keeper is arranged to embrace the tie-rod 13 of the handles, whereby the rod and the keeper serve to maintain the hopper in its proper position within the frame, and at the same time the hopper can move with its bail to accommodate itself to any unevenness or irregularity in the ground.

In the bottom of the hopper is formed a discharge slot or opening 25 for the escape of the seed and fertilizer from the hopper, and the size of this port or opening may be regulated by an adjustable slide, if desired. Across the hopper, within the same and above the discharge-slot therein, is an agitator shaft or roller 26, which is suitably journaled in the walls of the hopper. This agitator-roller carries suitable stirrers or teeth 27, and one end of the agitator-shaft is extended beyond the wall of the hopper to receive the ground-wheel 21, which is adapted to be rotated by frictional contact with the ground as the implement is drawn across the field, and thereby made to impart motion to the agitator to stir up the contents of the hopper.

It is thought the operation and advantages of my invention will be readily understood from the foregoing description, taken in connection with the drawings.

Various slight changes in the form and proportion of parts may be made without departing from the spirit of my invention.

Having thus fully described my invention, what I claim as new, and desire to secure by Letters Patent, is—

1. A combined cultivator and planter comprising a beam, the diverging shovel-bars bent laterally with respect to each other and fastened to the beam, the handles fastened to and braced by the shovel-bars, the hopper situated between the shovel-bars and contiguous to the rear extremity of the beam, an agitator-shaft journaled in the hopper and having at one end a ground-wheel, the divided bail having its members 16, 17, bent and spread laterally to embrace the front and sides of the hopper and united directly thereto, a single pivotal bolt attached to the divided bail members and the beam, a tie-bar 13 secured to the handles in rear of the hopper, and a loop-shaped keeper 22 secured to the rear wall of the hopper and embracing said tie-bar to prevent the hopper from tilting sidewise, whereby all the working parts of the implement are arranged compactly, substantially as described.

2. In a cotton-planter, the combination with a beam, a vertically-movable hopper, and the handles having a tie-bar, of a carrying-bail pivoted to the beam and fastened rigidly to the hopper, a ground-wheel carried by said hopper, and a longitudinal keeper fastened rigidly to the rear side of the hopper and engaging slidably with the tie-bar of the handles, substantially as described.

In testimony that I claim the foregoing as my own I have hereto affixed my signature in the presence of two witnesses.

BALUS J. McLESKEY.

Witnesses:
OLEON C. BROWN,
WILLIAM T. JOHNSON.